United States Patent
Hayashide

(10) Patent No.: US 8,958,132 B2
(45) Date of Patent: Feb. 17, 2015

(54) IMAGE READING APPARATUS

(71) Applicant: Canon Kabushiki Kaisha, Tokyo (JP)

(72) Inventor: Tadao Hayashide, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/023,004

(22) Filed: Sep. 10, 2013

(65) Prior Publication Data

US 2014/0071499 A1    Mar. 13, 2014

(30) Foreign Application Priority Data

Sep. 10, 2012 (JP) .................................. 2012-198297

(51) Int. Cl.
*H04N 1/04* (2006.01)
*H04N 1/00* (2006.01)
*H04N 1/409* (2006.01)

(52) U.S. Cl.
CPC ....... *H04N 1/00909* (2013.01); *H04N 1/00013* (2013.01); *H04N 1/00037* (2013.01); *H04N 1/00063* (2013.01); *H04N 1/00082* (2013.01); *H04N 1/4097* (2013.01)
USPC ........... 358/474; 358/475; 358/509; 382/275; 359/216.1

(58) Field of Classification Search
CPC ............ H04N 1/4097; H04N 1/00082; H04N 1/1013; H04N 1/1017; H04N 1/401; H04N 2201/03112; H04N 2201/0418; H04N 1/00087
USPC .......... 358/475, 474, 487, 509, 463, 2.1, 461, 358/1.15, 1.6, 1.9, 3.24, 3.27, 406, 451, 358/452, 482, 484, 494, 498, 506, 512, 519, 358/533; 382/275; 359/204, 216.1
See application file for complete search history.

(56) References Cited

U.S. PATENT DOCUMENTS

| 5,930,008 | A | * | 7/1999 | Nabeshima et al. | ........... 358/496 |
| 6,437,358 | B1 | * | 8/2002 | Potucek et al. | ........... 250/559.45 |
| 6,498,867 | B1 | * | 12/2002 | Potucek et al. | ............... 382/274 |
| 6,660,987 | B2 | * | 12/2003 | Koshimizu | ................. 250/208.1 |

(Continued)

FOREIGN PATENT DOCUMENTS

| EP | 1335577 A2 | 8/2003 |
| JP | 05-068168 A | 3/1993 |

(Continued)

OTHER PUBLICATIONS

Extended European Search Report issued in EP13004339.1 mailed Sep. 12, 2014.

*Primary Examiner* — Negussie Worku
(74) *Attorney, Agent, or Firm* — Rossi, Kimms & McDowell LLP

(57) ABSTRACT

The image reading apparatus includes a light transmissive member, a first light source causing a first light to enter the light transmissive member from a first side face of side faces thereof, a second light source illuminating a document laid on an upper face of the light transmissive member with a second light, an image sensor photoelectrically converting an optical image, and an imaging optical system forming on image sensor the object image with light exiting from the light transmissive member. The first light source is disposed such that the first light emitted therefrom and entering the light transmissive member from the first side face satisfies a total reflection condition at the upper and lower faces of the light transmissive member.

12 Claims, 13 Drawing Sheets

(56) References Cited

U.S. PATENT DOCUMENTS

| | | | |
|---|---|---|---|
| 6,753,984 B1 * | 6/2004 | Wada | 358/475 |
| 6,853,444 B2 * | 2/2005 | Haddad | 356/71 |
| 6,906,830 B1 * | 6/2005 | Hayashi | 358/474 |
| 7,224,483 B2 * | 5/2007 | Hanabusa et al. | 358/1.6 |
| 7,245,784 B2 * | 7/2007 | Takayama et al. | 382/275 |
| 7,733,538 B2 * | 6/2010 | Kanesaka et al. | 358/474 |
| 7,755,804 B2 * | 7/2010 | Ikeno et al. | 358/461 |
| 7,782,506 B2 * | 8/2010 | Suzuki et al. | 358/514 |
| 8,320,029 B2 * | 11/2012 | Kamei | 358/488 |
| 8,743,433 B2 * | 6/2014 | Kobayashi et al. | 358/504 |
| 2001/0030278 A1 | 10/2001 | Koshimizu | |
| 2005/0179954 A1 * | 8/2005 | Arai et al. | 358/3.26 |
| 2010/0309530 A1 * | 12/2010 | Kamei | 358/474 |

FOREIGN PATENT DOCUMENTS

| | | |
|---|---|---|
| JP | 10-290329 A | 10/1998 |
| JP | 2004-173002 A | 6/2004 |
| JP | 2005-006109 A | 1/2005 |
| JP | 2010-008177 A | 1/2010 |
| JP | 4464219 B2 | 2/2010 |
| JP | 2010-187080 A | 8/2010 |

* cited by examiner

IMAGE READING APPARATUS

BACKGROUND OF THE INVENTION

1. Field of the Invention

The present invention relates to an image reading apparatus, particularly to an apparatus capable of detecting a foreign object that may cause an image defect when performing image reading.

2. Description of the Related Art

In the related art, there are known image reading apparatuses capable of optically reading documents, such as image scanners, digital copiers and facsimiles, which perform "moving document reading" using an automatic document feeder (ADF) in order to efficiently read the documents.

The moving document reading will be described with reference to FIG. 14. In the moving document reading, documents laid on a document input tray 201 are separated one by one and fed (conveyed) to a reading position 202 set on a platen glass (contact glass) 203 of the reading apparatus. On an opposite side to the reading position 202 with respect to the platen glass 203, a carriage 200 holding an illumination unit 204, folding mirrors 205, an imaging optical system 206, a linear image sensor 207 and others is disposed in a standby state.

The document fed to the reading position 202 is illuminated by the illumination unit 204, and a line image of the document is projected on the linear image sensor 207 through she imaging optical system 206. The document is fed so as to continuously pass the reading position 202, and thereby the line images of respective parts of the document are continuously read by the linear image sensor 207. Line image data of the respective parts of the document from the linear image sensor 207 are sent to an image processor (not shown), and a two-dimensional image is produced thereby.

As shown in FIG. 14, there is a case where contaminants are adhered to front and rear surfaces of each document laid on the document input tray 201, and there is a case where a metal material such as a staple is attached to the document. The contaminants include a rubber eraser scrap, a paste, a white-out liquid or the like. The contaminants adhered to the front surface of the document may be rubbed against the platen glass 203 and a back plate 209 at the reading position 202 during the document feeding and be transferred to the platen glass 203 and the back plate 209 from the document to remain thereon. Moreover, if the document to which the metal material is attached is moved, the platen glass 203 and the back plate 209 may be scratched.

Furthermore, there is a case where, regardless of the document laid on the document input tray 201, contaminants are attracted from outside to be fixedly adhered to the reading position 202 due to static electricity or the like. What kind of image defect is generated due to such contaminants or scratches at the reading position 202 will be described with reference to FIG. 15B.

FIG. 15B shows three characters "can" as a two-dimensional image obtained through the image reading apparatus. The two-dimensional image is obtained by arranging line images, each extending in a main (horizontal) scanning direction, in a sub scanning direction. However, a vertical line is overlapped with the character "c." This is because a vertical black streak image is generated in the sub scanning direction due to a black contaminant adhered to the reading position when the document is moved in the sub scanning direction.

Although part of the character "a" is broken in FIG. 15B, this is caused by a scratch generated at the reading position. As well as the contaminant, the scratch fixed at a certain horizontal scanning position diffusely reflects light to cause a vertical white streak image in a black image area in the document where reflected light is originally little, and thereby a broken portion is generated in a black character image. Accordingly, when performing the moving document reading, it is strongly recommended to perform cleaning on image correction by detecting the contaminant or scratch. However, as understood from FIG. 15A showing a line image at a sub scanning position A in FIG. 15B, it is difficult to determine, only from the line image, whether a black or white point image included therein is image information or information generated due to the contaminant or scratch.

Japanese Patent Laid-open No. 2005-006109 discloses a method of detecting, by providing a reflective member right over a reading position, contaminants adhered to the reading position while a document is not fed. Specifically, as shown in FIG. 16, the method obliquely illuminates a platen glass 203 and a back plate 209 through an image reading illumination unit 204 to detect contaminants on an upper face of the platen glass 203.

However, the method disclosed in Japanese Patent Laid-open No. 2005-006109 may erroneously detect a foreign object (including an adhered contaminant or a scratch) on the back plate 209 as a foreign object on the upper face of the platen glass 203. The contaminant or the metal material is attached not only to the front surface of the document but also to a rear surface thereof, and the contaminant adhered to the rear surface of the document is rubbed against the back plate 209 as well as the contaminant adhered to the front surface of the document and rubbed against the upper face of the platen glass 203. Similarly, the metal material scratches the back plate 209. In the method disclosed in Japanese Patent Laid-open No. 2005-006109, an image sensor 207 receives light emitted from the illumination unit 204 and then reflected at the back plate 209 through an imaging optical system 206 to detect the foreign object, which makes it impossible to determine whether the contaminant or scratch is adhered or attached to the platen glass 203 or the back plate 209.

Since the document is not influenced even when the contaminant or scratch adhered or attached to the back plate 209, no image defect is generated. However, erroneous detection of the contaminant or scratch adhered or attached to the back plate 209 causes unnecessary image correction, which may generate another image defect. Furthermore, in a case where the image reading apparatus notifies a possibility of the image defect to a user, notifications due to the erroneous detection of the contaminant or scratch may bring the image reading apparatus to a halt and thereby deteriorate productivity.

SUMMARY OF THE INVENTION

The present invention provides an image reading apparatus capable of accurately detecting a foreign object on an upper or lower face of a transparent member, which may cause an image defect when performing image reading.

The present invention provides as an aspect thereof an image reading apparatus including a light transmissive member including an upper face on which a document is laid, a lower face opposite to the upper face and side faces different from the upper and lower faces, a first light source configured to emit first light and to cause the first light to enter the light transmissive member from a first side face of the side faces thereof, a second light source configured to illuminate the document laid on the upper face of the light transmissive member with a second light, an image sensor configured to photoelectrically convert an optical image, and an imaging optical system configured to form on image sensor the object image with light exiting from the light transmissive member. The first light source is disposed such that the first light emitted therefrom and entering the light transmissive member from the first side face satisfies a total reflection condition at the upper and lower faces of the light transmissive member.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Image Reading Apparatus

An image reading apparatus that is a first embodiment (Embodiment 1) of the present invention performs moving document reading which sequentially reads images of documents continuously fed by a document feeding unit through an imaging optical system and a linear image sensor provided at an imaging plane of the imaging optical system, at a reading position illuminated by an illumination unit.

Figure 1:
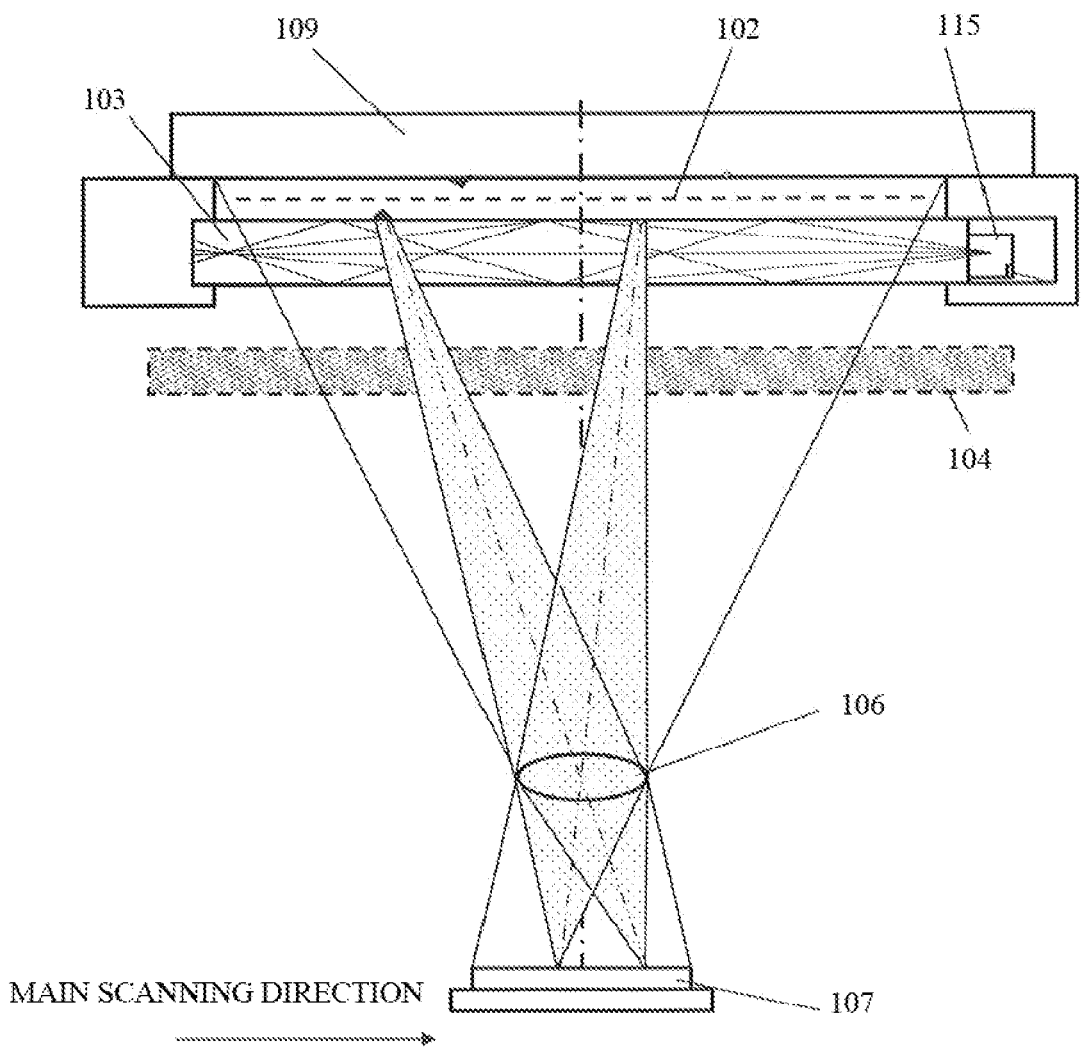
FIG. 1 shows detection of a foreign object (contaminant or scratch) on an upper or lower face of a platen glass in an image reading apparatus that is Embodiment 1 of the present invention.

As shown in FIG. 1, the image reading apparatus of this embodiment is characterized by performing foreign object detection by causing a detection light (first light) to enter a platen glass 103 from its side face. The platen glass 103 is a light transmissive member (transparent member) having an upper face where documents are placed, a lower face opposite to the upper face and four side faces formed between the lower and upper faces. In the following description, "a foreign object" refers to a contaminant or a scratch on the upper or lower face of the platen glass 103.

The platen glass 103 in this embodiment has a rectangular shape corresponding to the document; the rectangular shape has a length of 300 to 350 mm in its longitudinal direction corresponding to the longitudinal direction of an illumination area illuminated by an image reading illumination unit 104 (described later) and a width of 20 mm in a direction orthogonal to the longitudinal direction. The platen glass 103 has a thickness of 3 to 4 mm.

<Foreign Object Detection>

The detection light emitted from a detection light source (first light source) 115, such as a light emitting diode (LED) that emits infrared light, enters the platen glass 103 from at least one of paired side faces opposite to each other in a main scanning direction among the four side faces of the platen glass 103. The side face of the platen glass 103 from which the detection light enters is hereinafter referred to as "a light entering side face" or "a first side face", and the side face thereof opposite to the light entering side face in the main scanning direction is hereinafter referred to "a second side face". Prior to feeding of documents for image reading, the detection light source 115 is turned on in a state where the image reading illumination unit (second light source) 104 is turned off or illumination light (second light) from the illumination unit 104 is blocked to detect the foreign object on the upper or lower face of the platen glass 103 and store information on presence or absence of the foreign object.

Figure 2A:
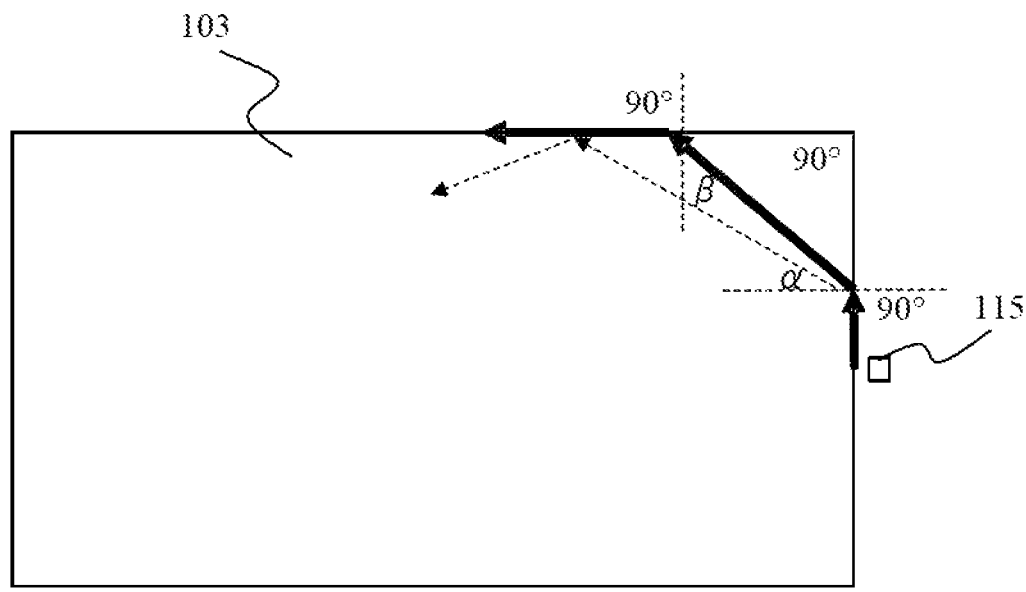
FIG. 2A shows a total reflection condition on the upper or lower face of the platen glass for detection light from a detection light source.
Figure 2B:
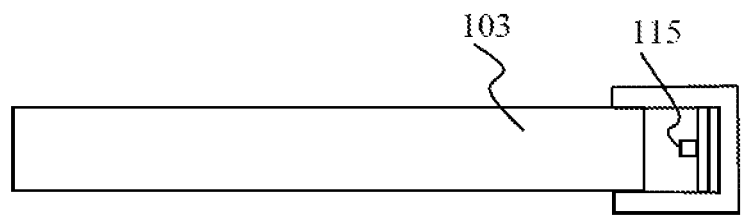
FIG. 2B shows a structure for holding the detection light source.

As shown in FIG. 2B, the detection light source 115 is held so as not to make contact with the light entering side face of the platen glass 103. The detection light source 115 is disposed such that the detection light emitted therefrom enters the platen glass 103 from the light entering side face and satisfies a total reflection condition at the upper and lower faces of the platen glass 103. Therefore, the detection light emitted from the detection light source 115 and entering the platen glass 103 from the light entering side face proceeds toward the other side face in the main scanning direction while being totally reflected at the upper and lower faces of the platen glass 103. As long as the reflection at the upper and lower faces of the platen glass 103 is (internal) total reflection, the detection light does not leak outside the platen glass 103, which results in that no light reach the imaging optical system 106 and the linear image sensor 107.

FIG. 2A shows conditions for the detection light emitted from the detection light source 115 to be totally reflected at the upper and lower faces of the platen glass 103. First, a solid line in FIG. 2A indicates an optical path of the detection light corresponding to a critical condition for the detection light emitted from the detection light source 115 and entering the platen glass 103 from the light entering side face thereof not to leak outside the platen glass 103. In the following description, the conditions of total reflection is considered assuming that the detection light enters the platen glass 103 from the light entering side face at a severest incidence angle (smaller than 90° in practice though FIG. 2A shows an incident angle of 90°), is refracted at a refraction angle $\alpha$ and then impinges on a next side face orthogonal to light entering side face at an incident angle of $\beta$ (critical angle).

When n represents a refractive index of the platen glass 103, the following equations are established:

$$1 \times \sin 90° \approx n \times \sin \alpha$$

$$1 \times \sin 90° = n \times \sin \beta$$

$$\alpha + \beta = 90°.$$

From the above equations, a relation of $\alpha \approx \beta \approx 45°$ is established, and thereby it is understood that the refractive index n under the critical condition is $\sqrt{2}$. Generally, the platen glass 103 is made of a glass or a plastic material, and its refractive index n is higher than $\sqrt{2}$. However, in this case, as indicated by a dotted line in FIG. 2A, total reflection is generated. When there is no contaminant or scratch as the foreign object on the upper or lower face of the platen glass 103, the detection light from the light source is totally reflected and thereby does not leak outside the platen glass 103. Therefore, no light reaches the linear image sensor 107 through the imaging optical system 106.

On the other hand, when there is a contaminant or scratch as the foreign object on the upper or lower face of the platen glass 103, the light reaching the foreign object is diffusely reflected. Therefore, part of the diffused light reaches the linear image sensor 107 through the imaging optical system 106. At a pixel position corresponding to the contaminant or scratch in the linear image sensor 107, information corresponding thereto is produced and output. The information is stored in the image reading apparatus. Since the image reading illumination unit 104 is turned off when the detection light source 115 is turned on, image information is not read at all. In addition, since the detection light is diffusely reflected only in the platen glass 103, information on a contaminant or scratch on a back plate 109 of the document feeding unit is not read as well. Therefore, only information on the contaminant or scratch on the platen glass 103 is read.

<Diffuse Reflection on Foreign Object>

Figure 5:
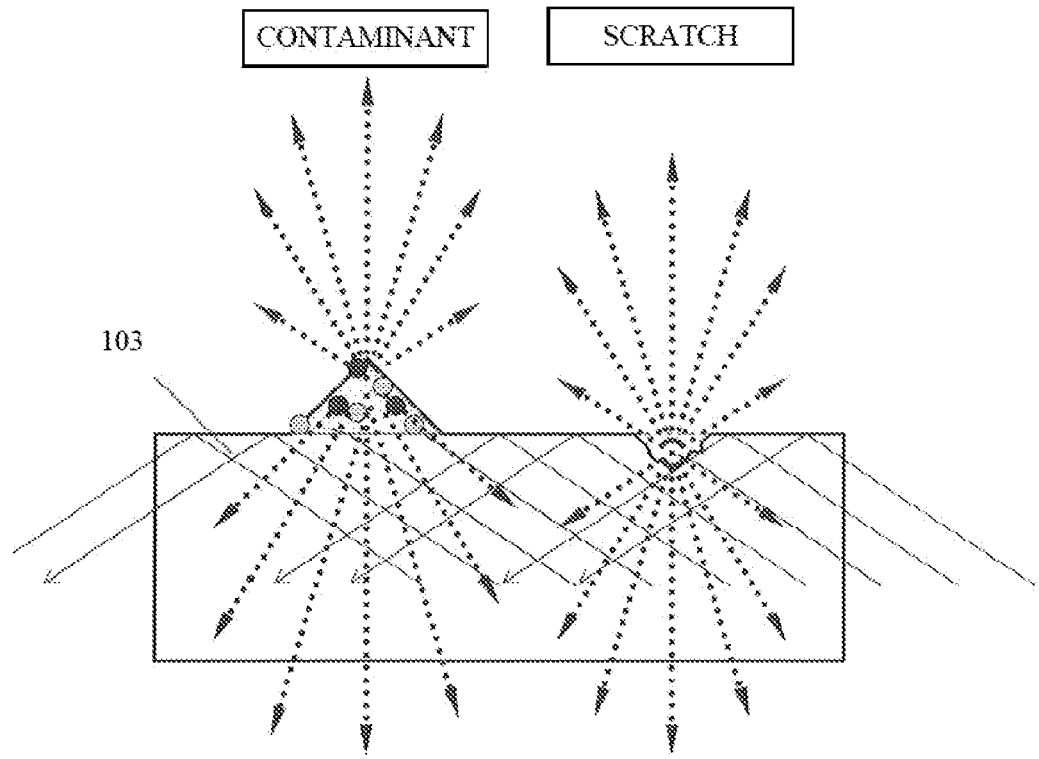
FIG. 5 shows a foreign object detection principle in each embodiment of the invention.

Next, the diffuse reflection by the foreign object (contaminant or scratch) will be described with reference to FIG. 5. The light emitted from the detection light source 115 and entering the platen glass 103 from the light entering side face thereof proceeds with being totally reflected by a surface (upper and lower faces) of the platen glass 103. However, as shown in FIG. 5, if the light impinges on the scratch, since its surface is not a planar surface, the light is diffusely reflected thereby. Although depending on a shape of the scratch, the diffusely reflected light normally proceeds to both inside and outside of the platen glass 103. Reading light reaching the linear image sensor 107 through the imaging optical system 106 out of the diffusely reflected light enables acquisition of information on the scratch.

Moreover, as shown in FIG. 5, the light impinging the contaminant is also diffusely reflected without being totally reflected. The contaminant adhered to the surface of the platen glass 103 is a mixture containing a cohesive substance. The cohesive substance is generally synthetic plastic, hand grime or the like. Such a cohesive substance adhered to the upper face of the platen glass 103 changes an interfacial state of the glass face so as to transmit part of the light, which has been totally reflected by the glass face without adhesion of the cohesive substance. The light transmitted through the glass face is diffusely reflected by minute air voids or the like included in the cohesive substance and then reaches a solid body in the contaminant. The light reaching a surface of the solid body is diffusely reflected depending on a surface state thereof.

Due to such diffuse reflection, the diffusely reflected light proceeds to the inside and outside of the platen glass 103. Although intensity of the diffusely reflected light changes depending on a color of the solid body or a transmittance of the cohesive substance, a sufficient intensity of the diffusely reflected light is provided even when a human vision recognizes the contaminant as a black substance that does not reflect light (the solid body is mostly black).

<Image Reading>

Figure 3:
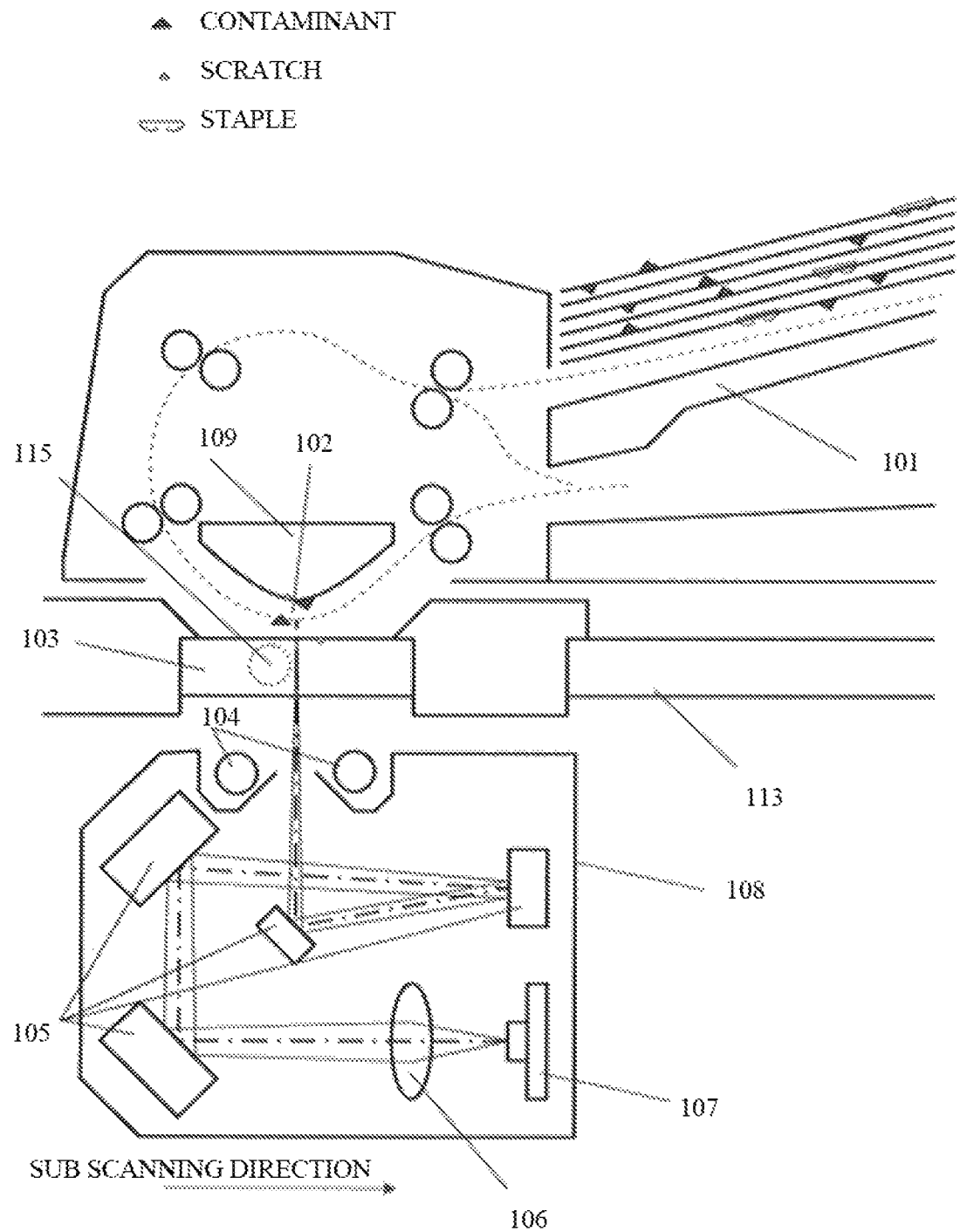
FIG. 3 is a schematic view showing the image reading apparatus of Embodiment 1.

An operation of the image reading (moving document reading) is subsequently performed in a state where the detection light source 115 is turned off, as in conventional image reading apparatuses. Specifically, as shown in FIG. 3, the documents laid on a document input tray 101 of the document feeding unit are separated one by one and fed (moved) to a reading position 102 set on the platen glass 103. On an opposite side to the reading position 102 with respect to the platen glass 103, a carriage 108 holding the illumination unit 104, folding mirrors 105, the imaging optical system 106, the linear image sensor 107 and others is disposed in a standby state.

The document fed to the reading position 102 is illuminated by the illumination unit 104, and a line image (optical image) of the document is projected on the linear image sensor 107 through the imaging optical system 106. The document is fed so as to continuously pass the reading position 102, and thereby the line images of respective parts of the document are continuously read by the linear image sensor 107. Line image data of the respective parts of the document from the linear image sensor 107 are sent to an image processor (not shown), and a two-dimensional image is produced thereby. The linear image sensor 107 extends in a longitudinal direction of the illumination area (longitudinal area) illuminated by the illumination unit 104.

<Process from Foreign Object Detection to Image Correction>

Figure 4A:
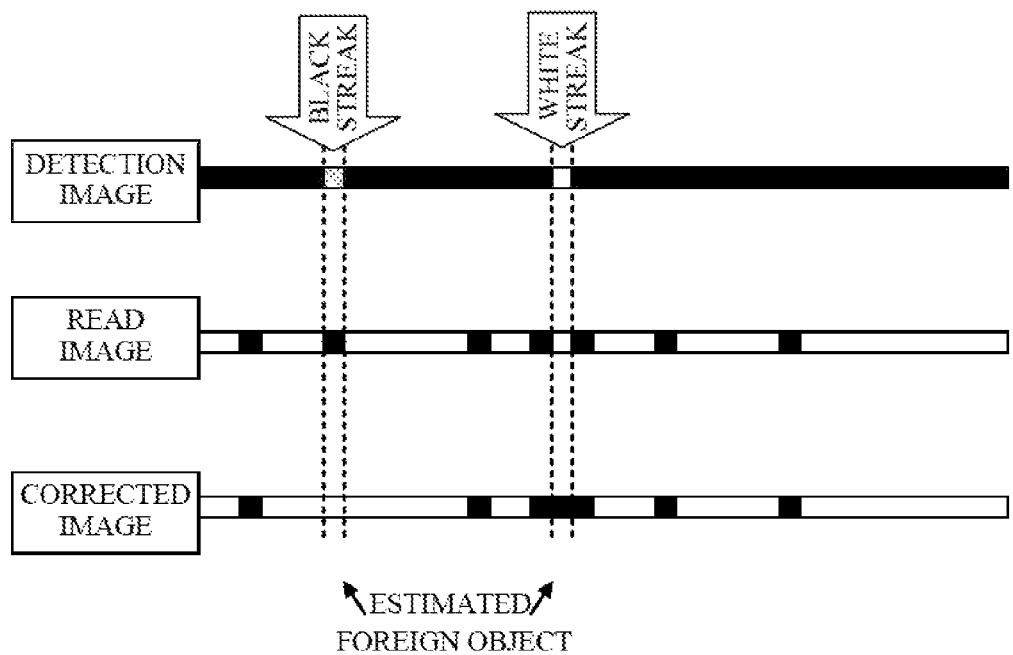
FIGS. 4A and 4B show image correction in Embodiment 1.
Figure 4B:
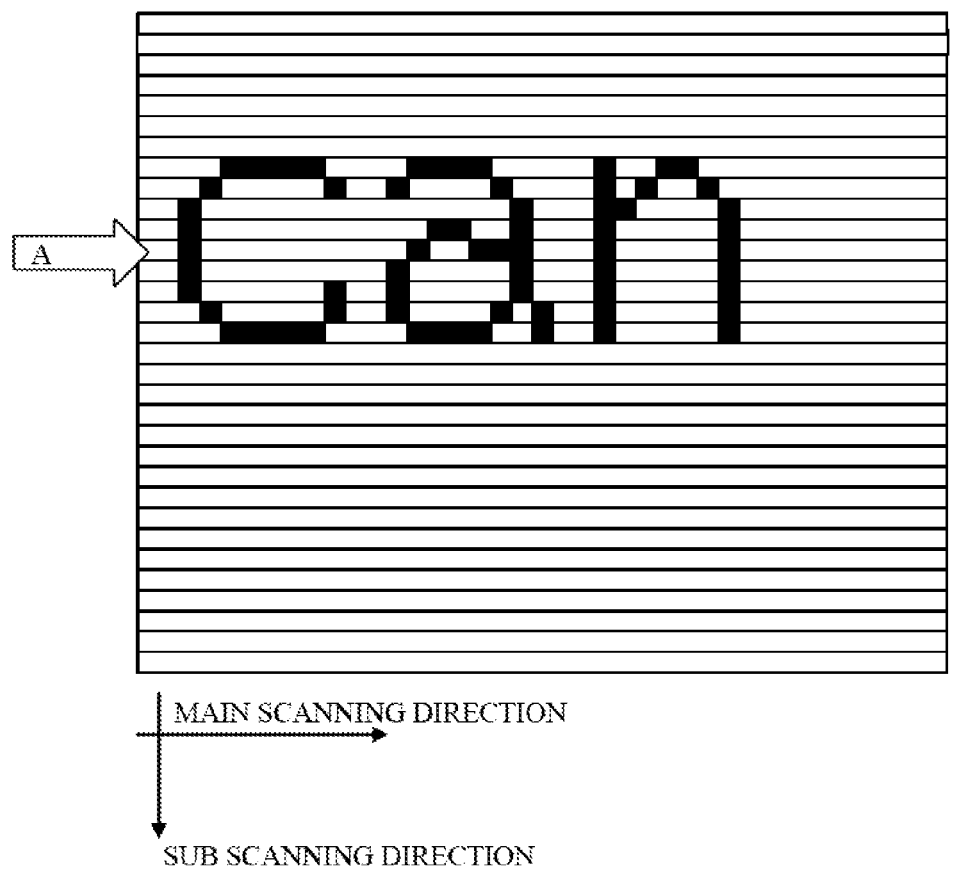
Figure 7:
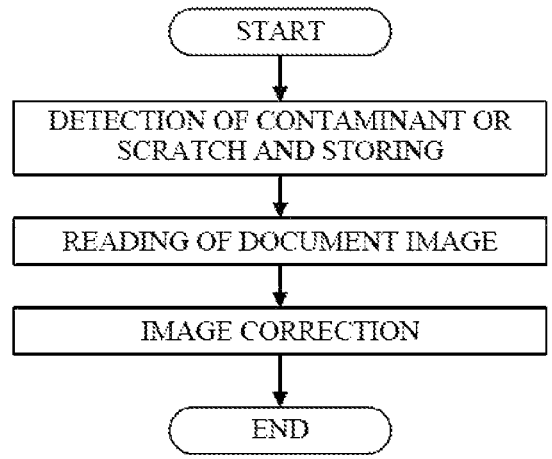
FIG. 7 is a flowchart showing processes from foreign object detection to image correction.

Next, processes from foreign object detection to image correction will be described with reference to FIGS. 4A, 4B and 7. An upper part of FIG. 4A shows a line image (hereinafter referred to as "a detection line image") obtained when only the detection light source 115 is turned on and the image reading illumination unit 104 is turned off or illumination light from the illumination unit 104 is blocked. At arrowed positions on the detection line image, images of a contaminant or scratch causing a black streak or a white streak are projected. A middle part of FIG. 4A shows a line image (hereinafter referred to as "a non-corrected line image") of the document illuminated by the image reading illumination unit 104. This non-corrected line image includes image defects caused by the contaminant or scratch at positions corresponding to the arrowed positions in the upper part of FIG. 4A.

Since positions of pixels (each hereinafter referred to as "a foreign object pixel") where the black or white streak is generated are determined from the line image shown in the upper part of FIG. 4A, it is possible to easily estimate information on each of the foreign object pixels from information on pixels adjacent to each of the foreign object pixel. Therefore, it is possible to correct the non-corrected line image to obtain a corrected line image shown in a lower part of FIG. 4A.

As described above, the image reading apparatus of this embodiment is provided with a correction unit (corrector) that corrects output from a first position in the linear image sensor 107 where the diffusely reflected light from the foreign object (contaminant or scratch) is received and thereby the foreign object is detected, by using output from a second position in the linear image sensor 107 where no foreign object is detected (that is, the diffusely reflected light is not received) and which is adjacent to the first position.

In such correction, the information on the foreign object pixel may be estimated in a same main scanning line or in combination with information on an adjacent main scanning line in a sub scanning direction. FIG. 4B shows a two-dimensional image produced from the corrected line images shown in the lower part of FIG. 4A. FIG. 7 shows a flowchart including the processes from the foreign object detection to the image correction.

<Simpler Configuration>

Figure 6:
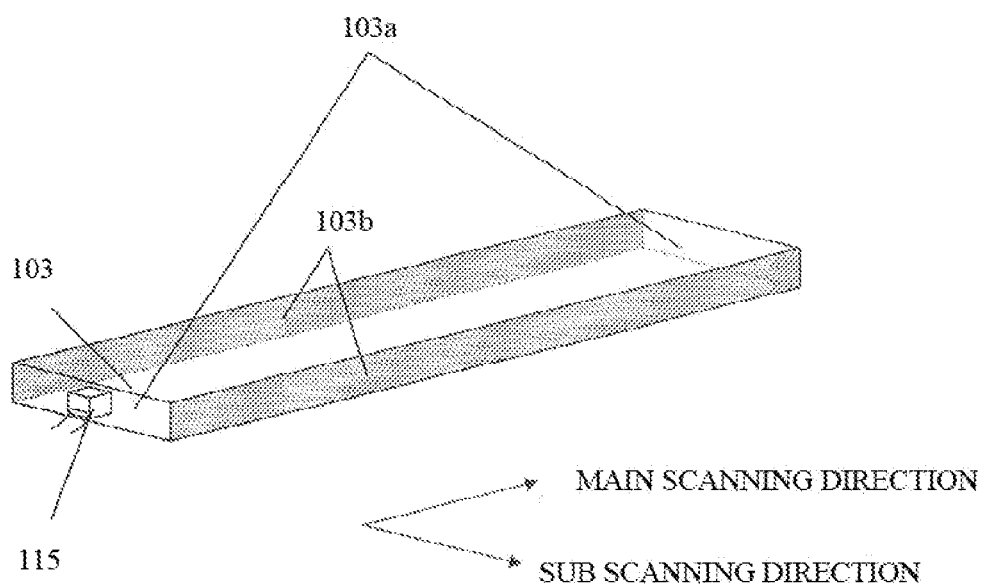
FIG. 6 is a schematic view showing a platen glass and a detection light source in a modified example of Embodiment 1.

Although the above-described simple configuration provided with the detection light source 115 enables the foreign object detection, a simpler configuration shown in FIG. 6 enables the foreign object detection with a smaller number of components. FIG. 6 shows a modified example of the platen glass 103 and the detection light source 115. The detection light source 115 is fixed facing (without being in contact with) one of paired side faces (first and second side faces) 103a of the platen glass 103 which are opposite to each other in the main scanning direction, similarly to the detection light source 115 shown in FIG. 2B. In addition, in this modified example, light entering the platen glass 103 from the first side face (light entering side face) is totally reflected not only at upper and lower faces of the platen glass 103, but also at right and left side faces (third and fourth side faces) 103b of the platen glass 103.

In this example, among the four side faces 103a and 103b of the platen glass 103, the right and left side faces 103b other than the first and second side faces 103a are each a glossy surface as a cracked surface without being corrected (finished).

Generally, a platen glass cut out from a plate-like glass member manufactured by a float glass process or the like is cracked and formed in a predetermined shape after being linearly scratched on its surface by using a high hardness tool such as a diamond tool and receiving a certain external force. The cracked surface not always a surface perpendicular to the upper and lower face of the platen glass, that is, may be a surface tilting with respect to the upper and lower faces, and therefore the tilting surface is corrected by using a hone. In contrast, this embodiment uses the above-mentioned glossy surface as the cracked surface without being corrected. Such a glossy surface as each of the right and left side faces 103b causes the light impinging thereon to be totally reflected and proceed toward the first and second side faces 103a, which causes a sufficient amount of light to reach the second side face.

Although each of the right and left side faces 103b as such a cracked surface without being corrected is generally not perpendicular to the upper face of the platen glass 103, an influence thereof does not become a problem in practice by increasing a size of a holding portion for the platen glass 103 in the image reading apparatus by several millimeters in the sub scanning direction. In addition, in a case where the right and left side faces 103b are corrected by using a hone, as another modified example of Embodiment 1, it is necessary to compensate for decrease of a reflectance of the corrected side face by increasing number of the detection light sources 115 or intensity of the light emitted from the detection light source 115.

In this embodiment, the detection light source is constituted by an infrared light emitting diode (LED) that emits infrared light which is invisible to eyes of a user, and thereby the foreign object detection can be implemented without being recognized by the user. Although the foreign object detection is often performed in a state no document is set and the back plate 109 for covering the document is removed from its position for image reading, this embodiment allows the foreign object detection in a state where the documents are set or in a state where the back plate 109 covers the document.

As described above, this embodiment enables achievement of an image reading apparatus capable of detecting a foreign object, such as a contaminant or a scratch, on the platen glass causing an image defect when performing image reading and of correcting the image detect.

Embodiment 2

A second embodiment (Embodiment 2) of the present invention achieves an image reading apparatus capable of facilitating cleaning or maintenance thereof implemented by a user or a service operator. The image reading apparatus this embodiment performs image reading by the moving document reading similarly to Embodiment 1. A configuration of this embodiment is characterized in that two detection light sources, that are each an LED emitting a green light, which is a visible light, are disposed facing light entering side faces (first side faces) of the platen glass 103 which are opposite to each other in the main scanning direction. Prior to feeding of documents for image reading, the detection light sources are turned on to detect a foreign object and store information on the foreign object.

Figure 9:
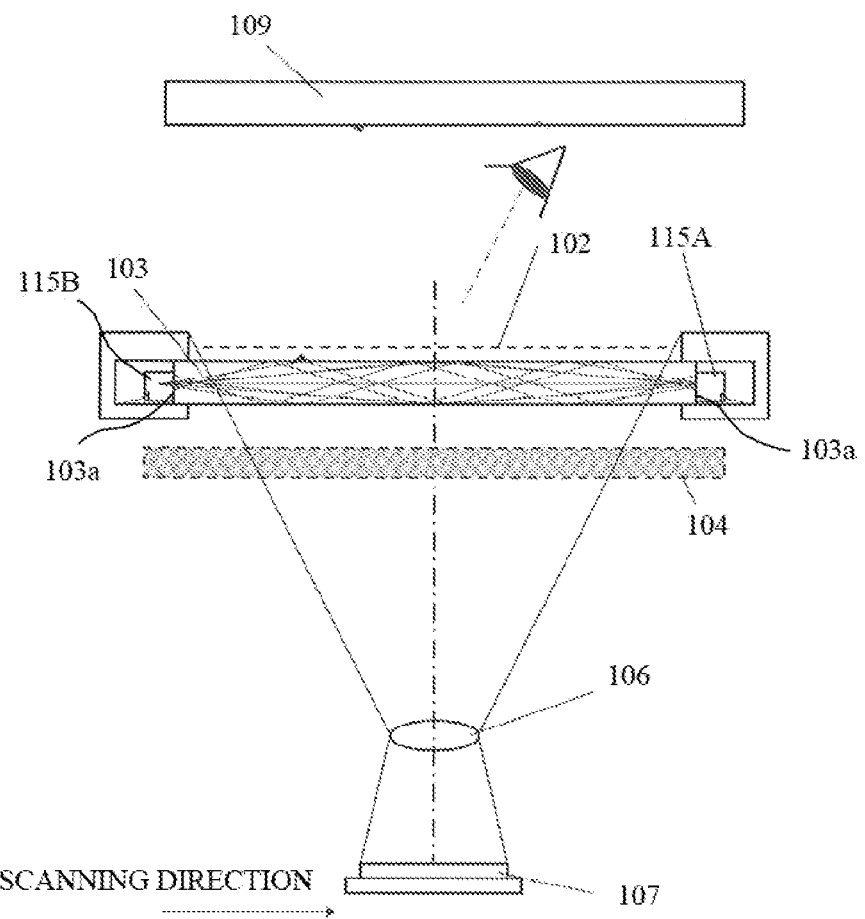
FIG. 9 shows foreign object detection in Embodiment 2.

Effects of providing the two detection light sources 115A and 115B will be described with reference to FIG. 9. The detection light sources 115A and 115B are respectively disposed facing both side faces (light entering side faces as first side faces) 103a of the platen glass 103 which are opposite in the main scanning direction. Detection lights emitted from the detection light sources 115A and 115B enter the platen glass 103 from the light entering side faces 103a, and each detection light entering from one of the light entering side faces 103a proceeds to the opposite light entering side face with being totally reflected. As long as the reflection at faces of the platen glass 103 is total reflection, the detection lights do not leak outside the platen glass 103, which results in that no light reach the imaging optical system 106 and the linear image sensor 107. However, the detection light reaching a contaminant or scratch on the platen glass 103 is diffusely reflected, and therefore part of the diffused light reaches the linear image sensor 107 through the imaging optical system 106.

Since the image reading illumination unit 104 is turned off when the detection light sources 115A and 115B are turned on, image information is not read at all. In addition, since the detection lights are diffusely reflected only in the platen glass 103, information on a contaminant or scratch on the back plate 109 is not read as well. Therefore, only information on presence or absence of the contaminant or scratch on the platen glass 103 is read.

Figure 8:
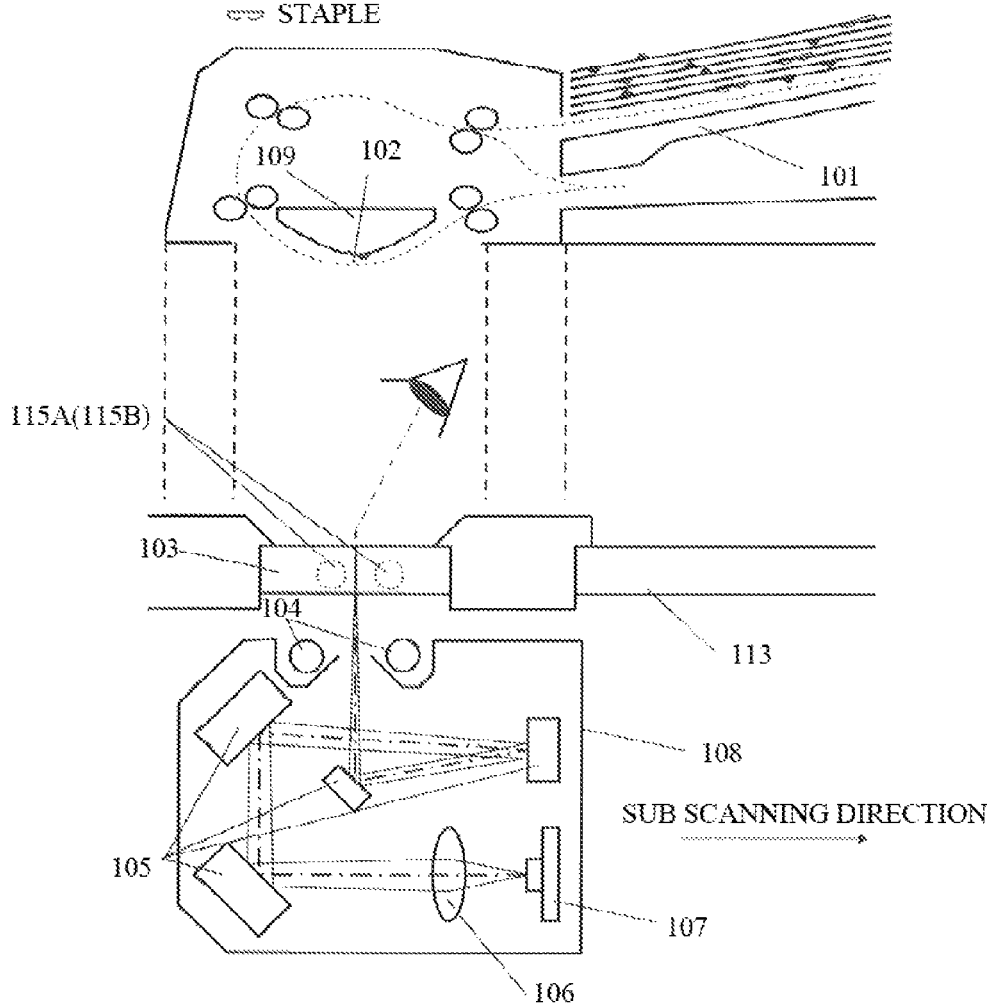
FIG. 8 is a schematic view showing an image reading apparatus that is Embodiment 2 of the present invention.

If detecting the contaminant or scratch existing on the platen glass 103, the apparatus informs to a user or service operator through an operation panel provided therein that it is necessary to clean the platen glass 103. The user or service operator then removes a document feeding unit (including the document input tray 101 and the back plate 109) in order to see the reading position as shown in FIGS. 8 and 9.

In the state where the detection light sources 115A and 115B are turned on, the detection lights are diffusely reflected by the foreign object (contaminant or scratch) as described above with reference to FIG. 5 in Embodiment 1. Therefore, it is possible to easily visually recognize (see) whether or not a foreign object exists. In this state, the user or service operator can clean the contaminant or repair the scratch.

An operation of the image reading (moving document reading) is subsequently performed in a state where the detection light sources 115A and 115B are turned off, as in conventional image reading apparatuses. Specifically, the documents laid on the document input tray 101 of the document feeding unit are separated one by one and fed to the reading position 102 set on the platen glass 103. On an opposite side to the reading position 102 with respect to the platen glass 103, the carriage 108 holding the illumination unit 104, the folding mirrors 105, the imaging optical system 106, the linear image sensor 107 and others is disposed in a standby state.

The document fed to the reading position 102 is illuminated by the illumination unit 104, and a line image of the document is projected on the linear image sensor 107 through the imaging optical system 106. The document is fed so as to continuously pass the reading position 102, and thereby the line images of respective parts of the document are continuously read by the linear image sensor 107. Line image data of the respective parts of the document from the linear image sensor 107 are sent to an image processor (not shown), and a two-dimensional image is produced thereby. In this embodiment, since the contaminant and scratch are removed, a high quality two-dimensional image can be obtained without performing image correction.

Figure 10:
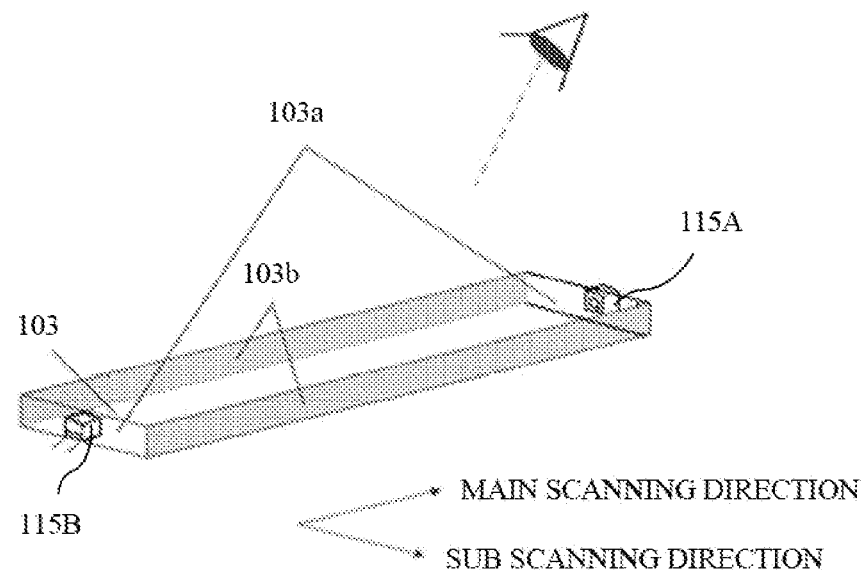
FIG. 10 is a schematic view showing a platen glass and a detection light source in Embodiment 2.

As described above, this embodiment enables detection of the contaminant or scratch by using a simple configuration including the detection light sources 115A and 115B. Furthermore, this embodiment employs the configuration shown in FIGS. 9 and 10 in which, in order to enable a user to easily recognize a position of the contaminant or scratch, the detection light sources 115A and 115B are respectively fixed facing both the side faces (light entering side faces) of the platen glass 103 which are opposite in the main scanning direction.

When detection of presence or absence of the foreign object is made from the line image read using the linear image sensor 107, a process such as gain adjustment considering attenuation may be performed. However, when the user or service operator sees the foreign object, an unnatural feeling may be given. Therefore, this embodiment increases intensity of the detection light by disposing the detection light sources 115A and 115B so as to face both the side faces (both ends) of the platen glass 103, which makes it possible to compensate for attenuation and increase visibility.

Also in this embodiment, as in Embodiment 1, the right and left side faces 103b of the platen glass 103 are each formed as a glossy cracked surface without being corrected. Although some glass materials attenuate light due to slight absorption, the detection lights from the detection light sources 115A and 115B proceed with being totally reflected at those glossy surfaces.

As described above, this embodiment enables achievement of an image reading apparatus capable of detecting a foreign object, such as a contaminant or a scratch, on the platen glass causing an image defect when performing image reading and of facilitating cleaning or repair of the foreign object by the user or service operator.

Embodiment 3

Figure 11:
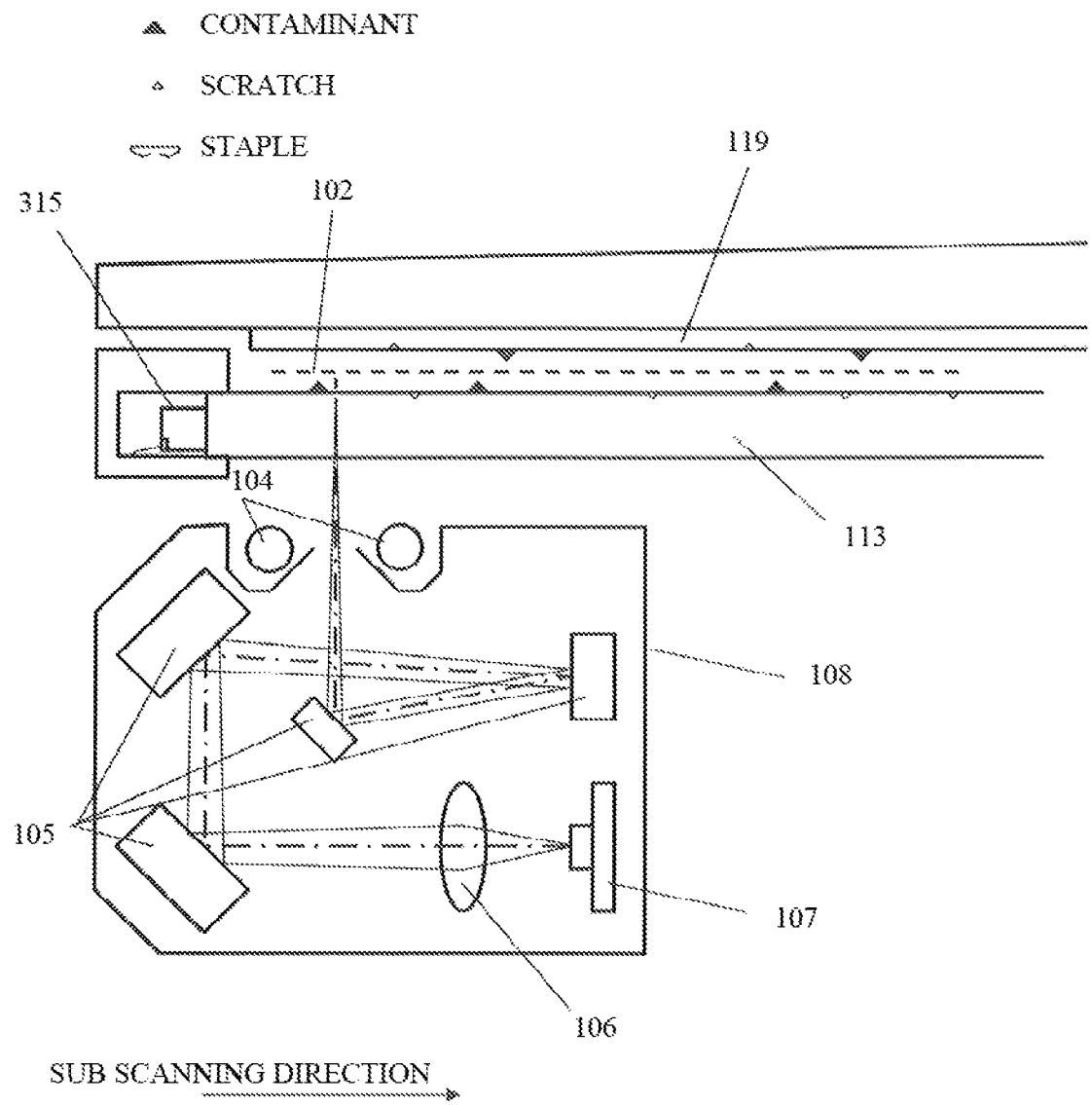
FIG. 11 is a schematic view showing an image reading apparatus that is Embodiment 3 of the present invention.

Next, an image reading apparatus that is a third embodiment (Embodiment 3) of the present invention will be described with reference to FIG. 11. Although Embodiments 1 and 2 each described the image reading apparatus that performs the moving document reading, the image reading apparatus of this embodiment performs so-called fix reading in which a document is fixed and read with movement of a carriage 108 in a sub scanning direction. Specifically, the image reading apparatus of this embodiment is provided with a driver configured to move the carriage 100 including an imaging optical system 106 and an image sensor 107.

Moreover, in this embodiment, LEDs (Light Emitting Diodes) each emitting infrared light are arranged facing a side face (light entering side face as a first side face) of a fix reading platen glass 113 having a shape corresponding to the document so as to form a foreign object detection light source array 315 having multiple light emitting points. The light entering side face extends in a main scanning direction orthogonal to the sub scanning direction (longitudinal direction). Detection light from the foreign object detection light source array 315 enters the platen glass 315 from its light entering side face.

Prior to image reading, in a standby state where a document is not yet laid on the platen glass 113, the light source array 315 is turned on while the image reading illumination unit 104 is turned off, and the carriage 108 is moved in the sub scanning direction (toward a right side in FIG. 11) to obtain a two-dimensional image.

As a result, as in Embodiments 1 and 2, information showing presence or absence of a foreign object (contaminant or scratch) is obtained; especially two-dimensional coordinate information is obtained in this embodiment. The light source array 315 has the same function as that of the detection light source 115 in Embodiment 1.

Since the image reading illumination unit 104 is turned off when the light source array 315 is turned on, image information is not read at all. In addition, since the detection light is diffusely reflected only in to platen glass 113, information on a contaminant or scratch on a back plate 119 is not read as well. Therefore, only information on the contaminant or scratch on the platen glass 113 is read.

Subsequent to the foreign object detection, an operation of the image reading is performed. Specifically, the document laid on the platen glass 113 is illuminated by turning on the illumination unit 104, and the carriage 108 is moved in the sub scanning direction to obtain line images of the document. Line image data of the document are sent to an image processor (not shown), and a two-dimensional image is produced thereby. Diffuse reflection by the foreign object (contaminant or scratch) is same as that described in Embodiment 1 with reference to FIG. 5.

Figure 12A:
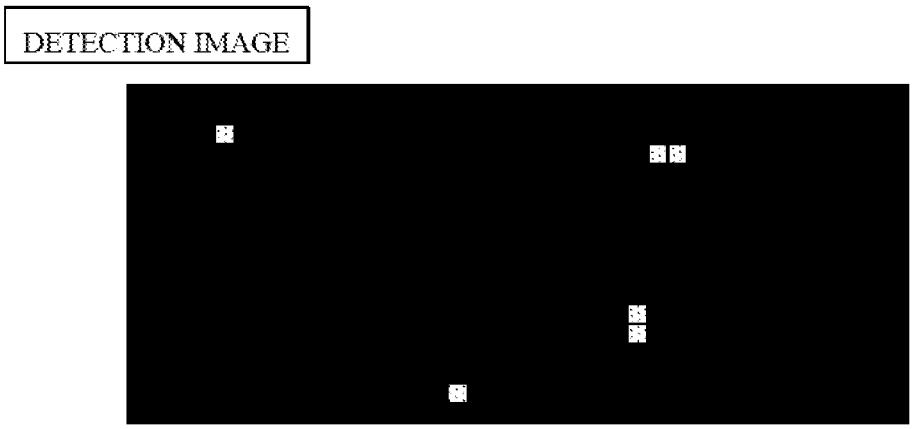
FIGS. 12A to 12C show image correction in Embodiment 3.

A method of separating image information of the foreign object and image information of the document and correcting the image information of the document will be described with reference to FIGS. 12A to 12C. FIG. 12A shows a two-dimensional image (foreign object detection image) obtained when only the foreign object detection light source array 315 is turned on. This image includes image defect portions due to projection of images of contaminants or scratches on the platen glass 113.

Figure 12B:
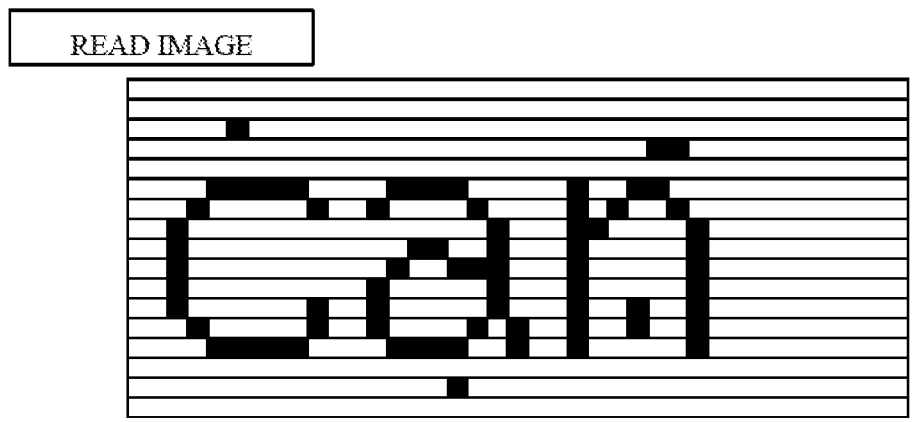
Figure 12C:
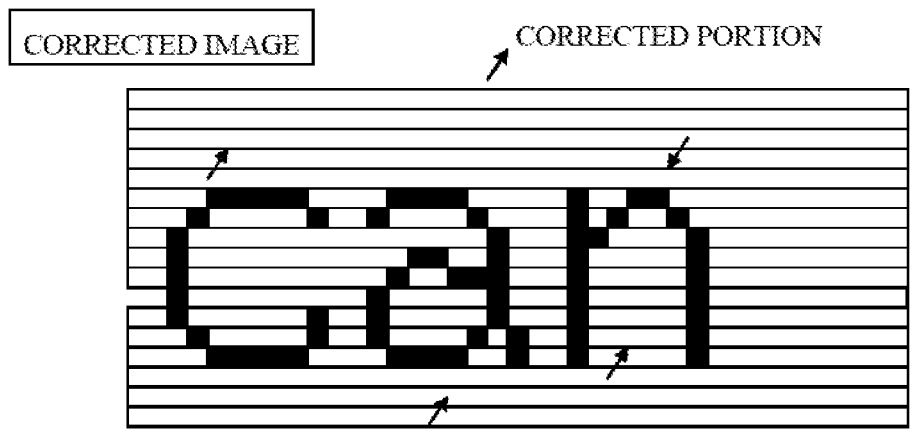

FIG. 12B shows a two-dimensional image of the document illuminated by the image reading illumination unit 104. This image includes some possibly-abnormal portions such as black stains and white defects. It is difficult to determine, only from this image, whether or not the possibly-abnormal portions are image defects or image portions originating the document. However, since the possibly-abnormal portions correspond to the image defect portions in the foreign object detection image shown in FIG. 12A, the possibly-abnormal portions are confirmed to be image defects. Therefore, correcting pixels (foreign object pixels) corresponding to the image defect by using information on pixels adjacent to the foreign object pixels enables obtaining a correct image (corrected image) as shown in FIG. 12C.

As described above, the image reading apparatus of this embodiment is provided with a correction unit (corrector) that corrects output from a first position in the image sensor 107 where the diffusely reflected light from the foreign object (contaminant or scratch) is received and thereby the foreign object is detected, by using output from a second position in the image sensor 107 where no foreign object is detected (that is, the diffusely reflected light is not received) and which is adjacent to the first position. In such correction, information on the foreign object pixel may be estimated in a same main scanning line or in combination with information on an adjacent main scanning line in the sub scanning direction. These processes from the foreign object detection to the image correction are shown in FIG. 7.

Figure 13:
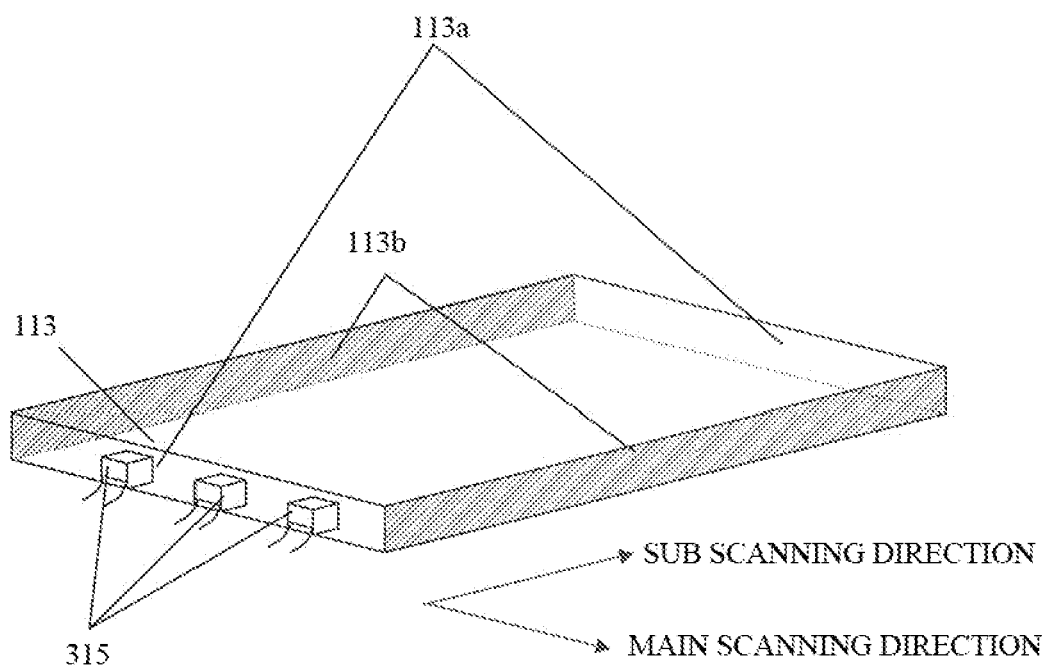
FIG. 13 is a schematic view showing a platen glass and a detection light source in Embodiment 3.
Figure 14:
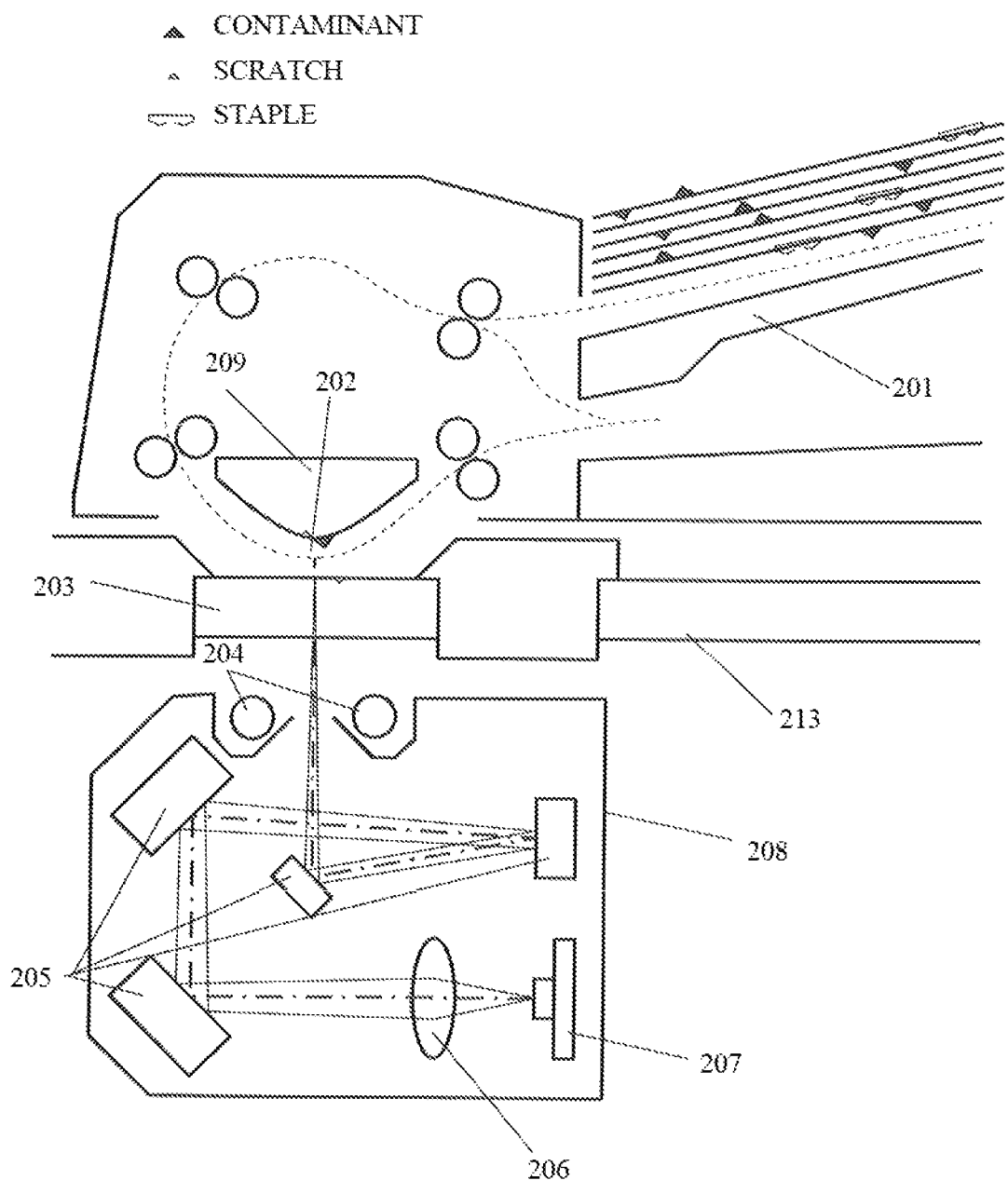
FIG. 14 is a schematic view showing a conventional image reading apparatus.
Figure 15A:
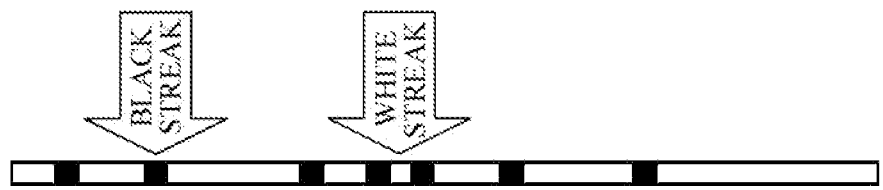
FIGS. 15A and 15B show an image streak generated in the conventional image reading apparatus.
Figure 15B:
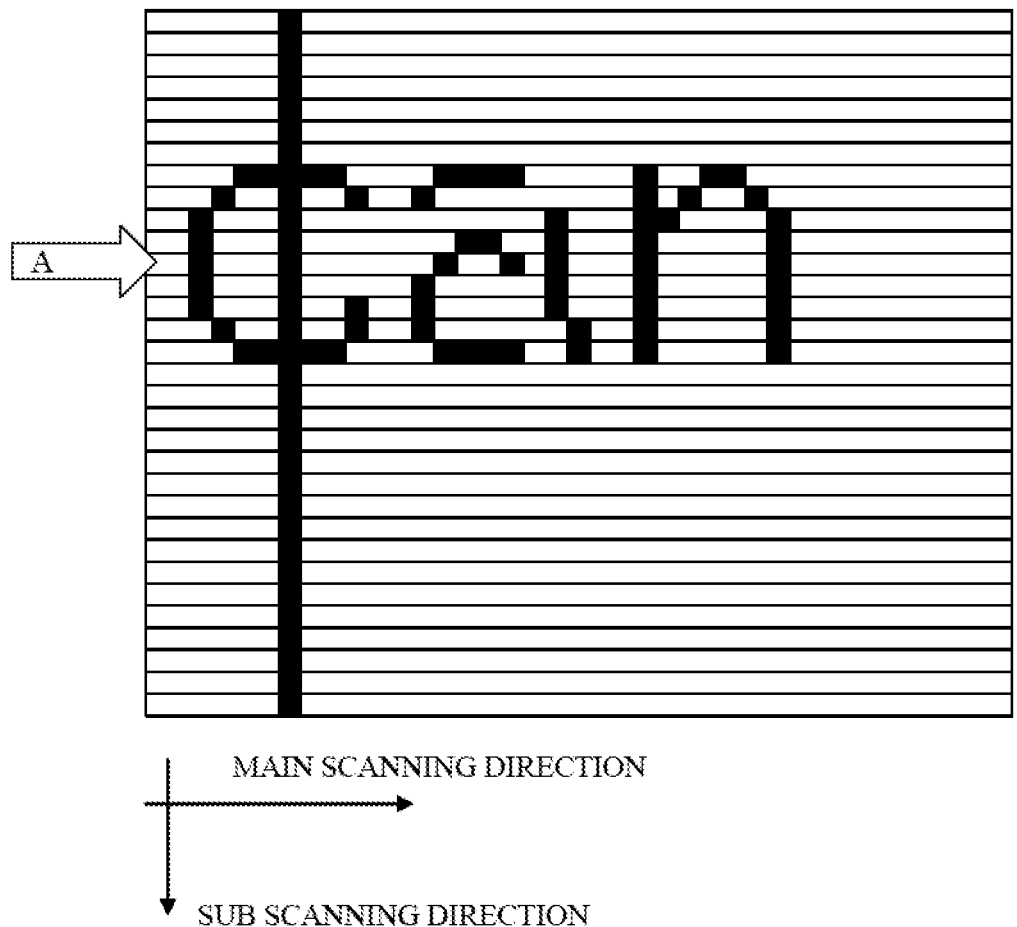
Figure 16:
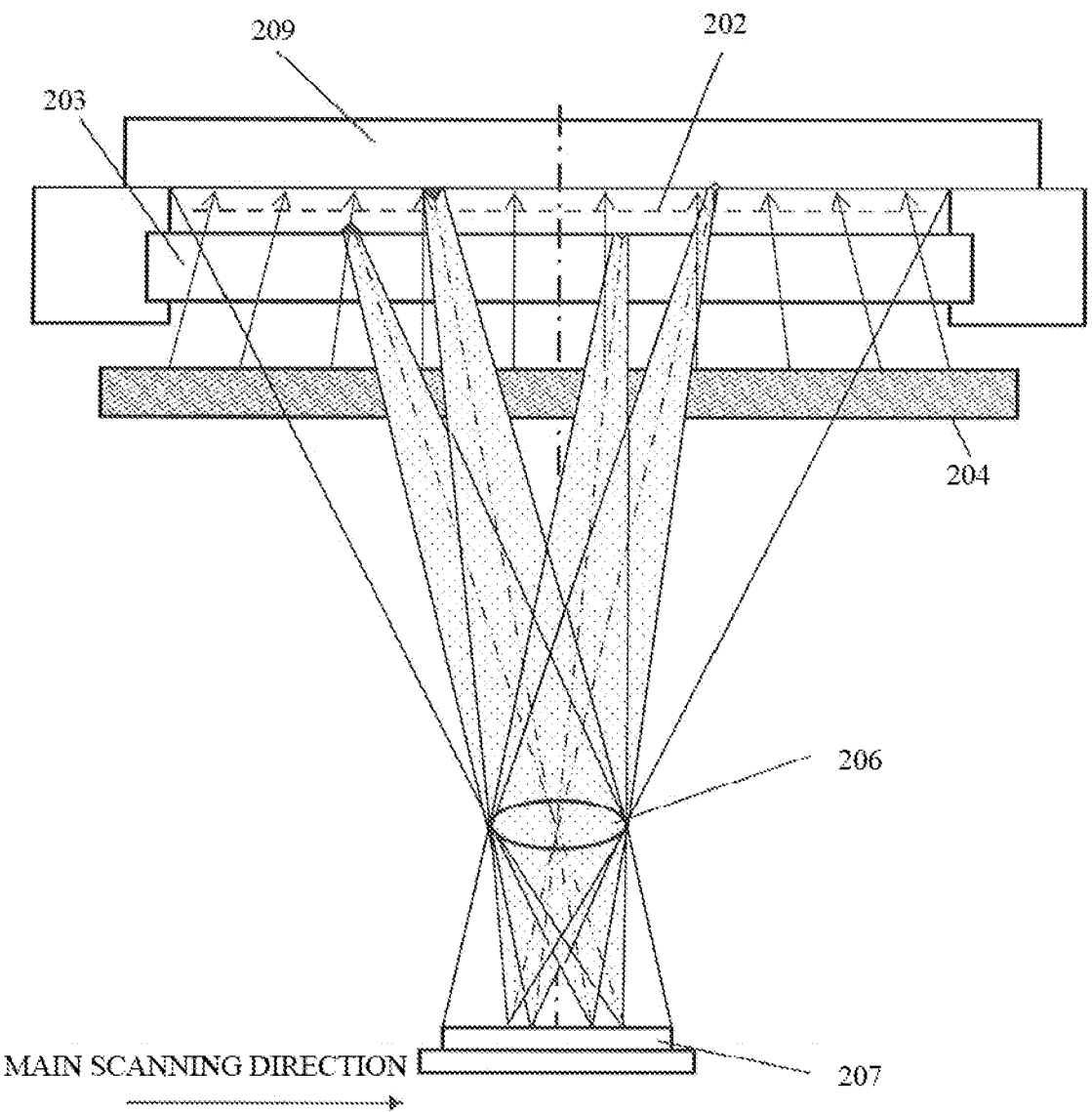
FIG. 16 shows foreign object detection in the conventional image reading apparatus.

Although the above-described simple configuration provided with the foreign object detection light source array 315 enables the foreign object detection, a simpler configuration shown in FIG. 13 enables the foreign object detection with a smaller number of components.

FIG. 13 shows a modified example of the platen glass 113 and the foreign object detection light source array 315. The light source array 315 is fixed facing (without being in contact with) a first side face (light entering side face) of paired side faces (first and second side faces) 113a of the platen glass 113. The paired side faces each extend in the main scanning direction. The platen glass 113 includes right and left side faces (third and fourth side faces) 113b each of which extends in the sub scanning direction. In this example, among the four side faces 113a and 113b of the platen glass 113, the right and left side faces 113b other than the first and second side faces 113a are each a gloss surface as a cracked surface without being corrected (finished).

Generally, a platen glass cut out from a plate-like glass member manufactured by a float glass process or the like is cracked and formed in a predetermined shape after being linearly scratched on its surface by using a high hardness tool such as a diamond tool and receiving a certain external force. The cracked surface is not always a surface perpendicular to the upper and lower face of the platen glass, that is, may be a surface tilting with respect to the upper and lower faces, and therefore the tilting surface is corrected by using a hone. In contrast, this embodiment uses the above-mentioned gloss surface as the cracked surface without being corrected. Such a gloss surface as each of the right and left side faces 113b viewed from the light entering side face (first side face) causes the light impinging thereon to be totally reflected and proceed toward the first and second side faces 113a, which causes a sufficient amount of light to reach the second side face.

Although each of the right and left side faces 113b as such a cracked surface without being corrected is generally not perpendicular to the upper face of the platen glass 113, an influence thereof does not become a problem in practice by increasing a size of a holding portion for the platen glass 113 in the image reading apparatus by several millimeters in the sub scanning direction.

In this embodiment, the light source array 315 is constituted by the infrared light emitting diodes that emit infrared light which is invisible to eyes of a user, and thereby the foreign object detection can be implemented without being recognized by the user.

As described above, this embodiment enables achievement of an image reading apparatus capable of detecting a foreign object, such as a contaminant or a scratch, on the platen glass causing an image defect when performing image reading by the fix reading.

As another modified example, a detection light source may be constituted by a fluorescence element or an electro luminescence (EL) element, which are different from the LED.

As further another modified example of Embodiment 3, a configuration may be employed which provides the light source arrays 315 so as to face both the side faces (first side faces) of the platen glass 113 which are opposite to each other in the main scanning direction and to cause the detection light to enter the platen glass 113 from these side faces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-198297, filed on Sep. 10, 2012, which is hereby incorporated by reference herein in its entirety.

What is claimed is:

1. An image reading apparatus comprising:
   a light transmissive member including an upper face on which a document is laid, a lower face opposite to the upper face and side faces different from the upper and lower faces;
   a first light source configured to emit first light and to cause the first light to enter the light transmissive member from a first side face of the side faces thereof;
   a second light source configured to illuminate the document laid on the upper face of the light transmissive member with a second light;
   an image sensor configured to photoelectrically convert an optical image; and
   an imaging optical system configured to form on the image sensor the object image with light exiting from the light transmissive member,
   wherein the first light source is disposed such that the first light emitted therefrom and entering the light transmissive member from the first side face satisfies a total reflection condition at the upper and lower faces of the light transmissive member.

2. An image reading apparatus according to claim 1,
   wherein the first light source is configured to cause the first light to enter the light transmissive member in a state where the second light source is turned off or the second light emitted from the second light source is blocked, and
   wherein the apparatus is configured to cause the image sensor to receive, of the first light emitted from the first light source, light diffusely reflected at the upper or lower surface of the light transmissive member without being totally reflected thereat and configured to thereby detect an foreign object on the upper or lower surface of the light transmissive member.

3. An image reading apparatus according to claim 2, further comprising:
   a corrector configured to correct output from a first position in the image sensor where the diffusely reflected light is received, by using output from a second position in the image sensor where the diffusely reflected light is not received and which is adjacent to the first position.

4. An image reading apparatus according to claim 1,
   wherein the light transmissive member has a rectangular shape whose longitudinal direction corresponds to a longitudinal direction of an illumination area illuminated with the second light emitted from the second light source, and wherein the first side face of the light transmissive member where the first light emitted from the first light source enters is at least one of side faces thereof opposite to each other in the longitudinal direction of the light transmissive member.

5. An image reading apparatus according to claim 1, wherein:

the light transmissive member has a shape corresponding to the document;

the first light source includes multiple light emitting points; and the first side face of the light transmissive member where the first light emitted from the light emitting points of the first light source enters is at least one of side faces thereof opposite to each other in a longitudinal direction of an illumination area illuminated with the second light emitted from the second light source.

6. An image reading apparatus according to claim 1, wherein, of the side faces of the light transmissive member, side faces other than the first side face and other than a second side face opposite to the first side face are glossy surface.

7. An image reading apparatus according to claim 1, wherein the image sensor is a linear image sensor that extends in a longitudinal direction of an illumination area illuminated with the second light emitted from the second light source.

8. An image reading apparatus according to claim 1, wherein the first light emitted from the first light source is infrared light or green light.

9. An image reading apparatus according to claim 1, further comprising:

a document feeding unit configured to move the document.

10. An image reading apparatus according to claim 1, further comprising:

a driver configured to move the imaging optical system and the image sensor.

11. An image reading apparatus according to claim 1, wherein the second light source is configured to illuminate the document with the second light through the upper and lower faces of the light transmissive member.

12. An image reading apparatus comprising:

a light transmissive member including an upper face on which a document is laid, a lower face opposite to the upper face and side faces different from the upper and lower faces;

a back plate disposed facing the upper face of the light transmissive member;

a first light source configured to emit first light and to cause the first light to enter the light transmissive member;

a second light source configured to illuminate the document laid on the upper face of the light transmissive member with a second light;

an image sensor configured to photoelectrically convert an optical image; and an imaging optical system configured to form on the image sensor the object image with light exiting from the light transmissive member, wherein the first light source causes the first light to enter the light transmissive member such that the first light does not reach the back plate.

* * * * *